US010753571B2

(12) United States Patent
Schubert et al.

(10) Patent No.: US 10,753,571 B2
(45) Date of Patent: Aug. 25, 2020

(54) VENTILATED MOTOR VEHICLE LIGHTING DEVICE

(71) Applicant: Automotive Lighting Reutlingen GmbH, Reutlingen (DE)

(72) Inventors: Uwe Schubert, Plochingen (DE); Achim Bathe, Reutlingen (DE)

(73) Assignee: Automotive Lighting Reutlingen GmbH, Reutlingen (DE)

( * ) Notice: Subject to any disclaimer, the term of this patent is extended or adjusted under 35 U.S.C. 154(b) by 65 days.

(21) Appl. No.: 15/187,111

(22) Filed: Jun. 20, 2016

(65) Prior Publication Data

US 2016/0377255 A1 Dec. 29, 2016

(30) Foreign Application Priority Data

Jun. 26, 2015 (DE) ........................ 10 2015 211 906

(51) Int. Cl.

| | |
|---|---|
| ***B60Q 1/00*** | (2006.01) |
| ***F21V 31/03*** | (2006.01) |
| ***F21S 45/37*** | (2018.01) |
| ***F21S 45/33*** | (2018.01) |

(52) U.S. Cl.
CPC ............... *F21S 45/37* (2018.01); *F21S 45/33* (2018.01)

(58) Field of Classification Search
CPC ........ F21S 48/335; F21S 48/337; F21S 45/33; F21S 45/37
See application file for complete search history.

(56) References Cited

U.S. PATENT DOCUMENTS

| | | | | | |
|---|---|---|---|---|---|
| 6,071,000 | A | 6/2000 | Rapp | | |
| 6,497,507 | B1 * | 12/2002 | Weber | F21S 48/335 | 362/218 |
| 6,595,672 | B2 * | 7/2003 | Yamaguchi | B60Q 1/0088 | 362/264 |
| 7,275,848 | B2 * | 10/2007 | Chinniah | F21S 48/328 | 362/373 |
| 7,329,033 | B2 * | 2/2008 | Glovatsky | B60Q 1/0052 | 362/294 |
| 7,427,152 | B2 * | 9/2008 | Erion | F21S 48/1159 | 362/373 |

(Continued)

FOREIGN PATENT DOCUMENTS

| | | | |
|---|---|---|---|
| DE | 19524163 | A1 | 1/1997 |
| DE | 10012248 | A1 | 9/2001 |

(Continued)

OTHER PUBLICATIONS

Communication dated Nov. 23, 2016 enclosing the European Search Report dated Nov. 15, 2016 issued by the European Patent Office in European Application No. 16172911.6.

*Primary Examiner* — Arman B Fallahkhair
(74) *Attorney, Agent, or Firm* — Howard & Howard Attorneys PLLC

(57) ABSTRACT

A motor vehicle lighting device has a housing and a cover plate covering a light exit hole in the housing, at least one ventilation intake opening and at least one air discharge opening, wherein an air guidance structure is disposed on the outside of the ventilation intake opening. The air guidance structure acts to deflect air that flows along the outside of the lighting device as a result of the effect of wind caused by driving, into an interior of the lighting device.

12 Claims, 5 Drawing Sheets

(56) References Cited

U.S. PATENT DOCUMENTS

| | | | | |
|---|---|---|---|---|
| 8,256,944 | B2 * | 9/2012 | Yasuda | F21S 48/1159<br>362/294 |
| 8,746,937 | B2 * | 6/2014 | Hong | F21S 48/335<br>362/294 |
| 2009/0268475 | A1 * | 10/2009 | Ball | F21S 48/328<br>362/373 |

FOREIGN PATENT DOCUMENTS

| | | | |
|---|---|---|---|
| DE | 202012009488 | U1 | 11/2012 |
| DE | 102013218329 | A1 | 3/2015 |
| JP | 2002124123 | A | 4/2002 |

* cited by examiner

VENTILATED MOTOR VEHICLE LIGHTING DEVICE

CROSS-REFERENCE TO RELATED APPLICATIONS

The present application claims priority to and all the benefits of German Patent Application No. 10 2015 211 906.8, filed on Jun. 26, 2015, which is hereby expressly incorporated herein by reference in its entirety.

BACKGROUND OF THE INVENTION

1. Field of the Invention

The present invention relates to a motor vehicle lighting device and more specifically, to a ventilated motor vehicle light device.

2. Description of the Related Art

A lighting device is disclosed in DE 100 12 248 A1 in the form of a headlamp. The known lighting device has a housing and a cover plate that covers a light exit hole in the housing, as well as at least one ventilation intake opening and at least one air discharge opening. An air guidance structure is disposed on the outside of the ventilation intake opening.

As known in the related art, the air guidance structure is a separate component from the housing and the cover plate, which is snapped onto a socket on the housing. Numerous structures of this type are disposed on the rear surface of the housing.

SUMMARY OF THE INVENTION

The present invention is not limited to headlamps, but rather, relates to signal lights as well, in particular tail lamps, but also separate front lamps. Thus, the term "lighting device" comprises headlamps and signal lamps.

The ventilation intake and air discharge of the lighting device for motor vehicles serves to remove moisture from the interior of the lighting device. In particular, moisture condensed on the inner surface of the cover plate appears as an unattractive haze from the outside. Some end customers assume erroneously that this is a defect, and return to the dealer to complain.

The ventilation intake and outlet of the lighting device should prevent the formation of such a water film as far as possible, and remove it, if such a water film nevertheless does develop.

The present invention includes air guidance structure that acts to deflect air flowing along the outside of the lighting device into the interior by the wind effect caused by driving, with an intended use of the lighting device in a moving motor vehicle.

As a result of this active deflection of air, the air volume flowing through the lighting device is increased for each unit of time, i.e. the air volume flow is increased. The increased air volume flow can absorb and remove more moisture from the lighting device per each time unit than a smaller air volume flow, such that an improved and more effective ventilation intake and discharge is obtained.

The invention reduces, in particular the risk of formation of a water film, and accelerates the removal of an already existing water film on the cover plate of a headlamp or a tail lamp or a front lamp during the driving of the motor vehicle.

In one embodiment of the present invention, the air guidance structure is a component of the cover plate, and is disposed between an end of the cover plate lying in a sealing bed and a light exit surface of the cover plate, which sealing bed is a material bonded component of the housing, and forms a mount for the cover plate.

In one embodiment, the ventilation structure is a component of the housing.

The ventilation structure may be a component of an element with which a joint between the housing and/or the cover plate, on one side, and an external component of the motor vehicle on the other side, is covered.

In another embodiment, the ventilation intake opening is located at a position on the housing where the air guidance structure generates a back pressure in an air flow flowing along the housing, driven by the wind generated by driving the motor vehicle, with an intended use of the lighting device in a moving motor vehicle. The air discharge opening may be located at a position on the housing where there is no back pressure, or at least a lower back pressure, or even a suction.

In one embodiment, the ventilation intake opening may be disposed transverse to a housing wall adjacent to the ventilation intake opening in the air flow, on the exterior of the sealing bed.

In one embodiment, the ventilation intake opening, with respect to the direction of the air flowing outside the housing, may be driven by the wind generated by driving, and lies behind the first air guidance structure lying in the oncoming air.

A filter may be disposed between the ventilation intake opening and the interior. The size of the pores of the filter allows air to flow in, but prevents, in particular, insects and smaller and larger contaminant particles, such as dust and grains of sand, from entering.

The air discharge opening lies in the air flow on the outside of the sealing bed, transverse to the housing wall.

In one embodiment, the air discharge opening lies behind the first air guidance structure with respect to the direction of the air driven by the wind flowing along the outside of the housing caused by driving, such that the air guidance structure lies in front of the air discharge opening in this direction, in the oncoming air.

In one embodiment, the ventilation intake opening may be disposed, together with the first air guidance structure, on a first side of the housing, which lies opposite a second side of the housing, on which the air discharge opening, together with the other air guidance structure, is disposed.

The first side and the opposite second side are, respectively, the right-hand side and the left-hand side of the lighting device, or vice versa, in a design with an intended use of the lighting device.

The first side is the undersurface, and the opposing second side, with an intended use of the lighting device, is the upper surface of the lighting device, such that the air flow flows upward through the interior from the bottom.

The air discharge opening is disposed in the lateral direction on a side lying opposite the side with the ventilation intake opening.

Air conducting structures, such as channels and/or ribs and/or tubes are disposed in the interior of the lighting device, act to conduct at least portions of the ventilation intake volume flow, preferably toward the specific regions in the lighting device.

Further advantages can be derived from the following description, the drawings and the dependent claims. It is to be understood that the features specified above and still to be explained below can be used not only in the respective given combinations, but also in other combinations or in and of themselves, without abandoning the scope of the present invention.

Exemplary embodiments of the invention are depicted in the drawings, and shall be explained in greater detail in the following description.

DETAILED DESCRIPTION OF THE INVENTION

Identical reference symbols in various Figures indicate respective elements that are identical, or at least comparable in terms of their function.

Figure 1:
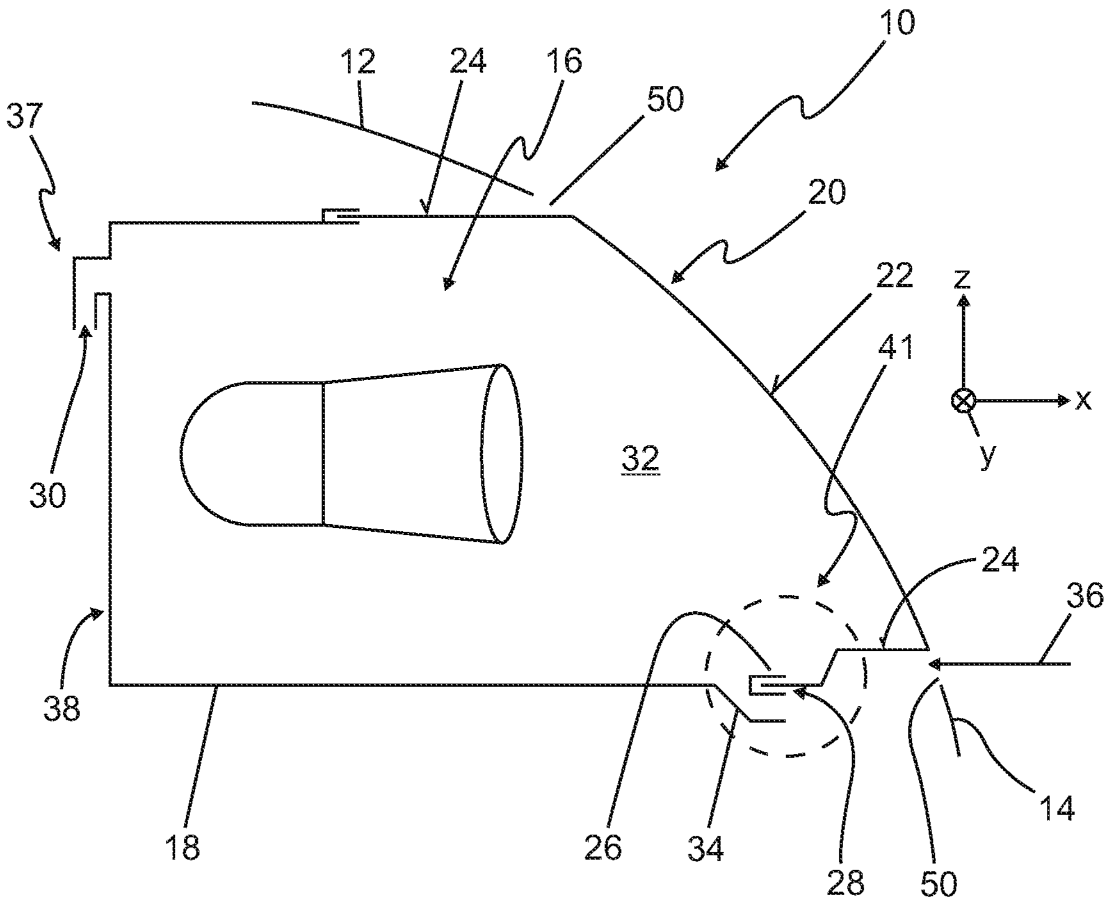
FIG. 1 shows a first exemplary embodiment in a vertical section.

In detail, FIG. 1 shows an assembly, composed of a motor vehicle lighting device 10 and at least one external component 12, 14, in a vertical section.

The external components 12, 14 are, for example, a part of the vehicle body, a part of an adjacent lighting device, having its own housing, or a part of a cooling unit of the motor vehicle bordering on the lighting device. The depicted assembly is obtained with an intended used of the lighting device, in which the lighting device is incorporated in a motor vehicle.

The cutting plane of the vertical section is the x-z plane of a right-handed and orthogonal coordinate system, the x-axis of which corresponds to the direction of the longitudinal axis of the vehicle, the y-axis of which is transverse thereto, and parallel to the horizon, and the z-axis of which is transverse to the x-axis, the y-axis, and extends vertically upward. This directional convention for the x-axis applies in particular to headlamps and front lamps. In the following, it shall first be assumed that the lighting device is a headlamp. The invention is not limited to headlamps, however, but can also be implemented with front lamps and tail lamps.

At least one light module 16 is disposed in the interior of the lighting device 10, which is configured to generate a light distribution for the lighting device that complies with regulations, this being either a headlamp light distribution or a signal lamp light distribution.

The lighting device 10 has a housing 18 and a transparent cover plate 20. The cover plate is in the shape of a shell, having a transparent base 22 and an edge 22 encircling the base 22 and projecting up from the base in the manner of a wall. The cover plate covers the light exit surface of the housing 18 with its transparent base 22. The edge 24 is received by a sealing bed 26 encompassing the light exit opening in the housing 18, and retained in the sealing bed 26 in a tight and secure manner.

The lighting device has a ventilation intake opening 28 and an air discharge opening 30. The ventilation intake opening allows air to flow into an interior 32 of the lighting device delimited by the housing 18 and the cover plate 20. The air discharge opening 30 allows air to flow out of the interior 32. An air guidance structure 34 is disposed on the outside of the housing, on the ventilation intake opening 28, i.e. outside the interior 32. This air guidance structure 34 can be a rib protruding out of the housing, or a socket projecting up from the housing. The important thing is that the air guidance structure 34 is configured and disposed to deflect air 36, which flows along the exterior of the lighting device 10 in an intended use of the lighting device 10 in a moving motor vehicle, as a result of the effects of wind generated by driving, into the interior 32.

The air 36 passes through gaps 50 located between the lighting device 10 and the external components 12, 14, in the body of the motor vehicle. The air guidance structure 34 backs up the air flow, and generates an excess pressure in relation to the wind generated by driving by the backwash effect. The air guidance structure 34 is located behind the ventilation intake opening 28 in the oncoming air 36 in the flow direction of the oncoming air 36, such that the excess pressure is directed toward the ventilation intake opening 28. As a result, there is a pressure difference between the interior and exterior, which deflects a portion of the exterior oncoming air 36, and allows it to enter through the opening 28 into the interior 32.

In one embodiment, the air guidance structure 34 is a material bonded component of the housing 18 or the cover plate 20. In the depicted exemplary embodiment, the air guidance structure 34 is a component of the housing 18. The air guidance structure 34 may be made of the same material as the housing or the cover plate. It thus may be made from plastic, and is formed on the respective component during the injection molding of the housing or the cover plate.

The air discharge opening 30 is disposed such that it is spatially separated from the ventilation intake opening 28. In the embodiment illustrated herein, the air discharge opening is the flow cross section of a socket 37, which is disposed on the rear surface 38 of the housing 18, facing away from the light exit side of the housing 18, and which has a downward curved or bent course. Air flowing through the ventilation intake opening 28 absorbs moisture in the interior 32 of the housing 18, and transports the absorbed moisture out of the housing 18 via the air discharge opening 30. In order to ensure such an air flow, the ventilation intake opening 28 and the air discharge opening 30 are disposed on the lighting device 10 such that there is a greater air pressure in the ventilation intake opening 28 than in the air discharge opening 30 with an intended use in a motor vehicle, under the effects of wind generated by driving.

In the embodiment illustrated in FIG. 1, the ventilation intake opening 28 is located where the air guidance structure 34 generates a back pressure, in an intended use in a moving motor vehicle, in the air flow flowing along the housing 18 driven by the wind generated by driving, and the air discharge opening 30 is located at a position where there is no back pressure, or there is at least a lower back pressure, or even a suction.

In the embodiment illustrated in FIG. 1, the ventilation intake opening 28 is transverse to the housing wall adjacent to the ventilation intake opening 28 in the air flow 36 on the outside of the sealing bed 26. With respect to the direction of the air 36 flowing on the exterior of the housing driven by the wind generated by driving, the ventilation intake opening 28 is behind the first air guidance structure 34 in the oncoming air 36. Because the ventilation intake opening 28 lies on the sealing bed 26, the advantage of a particularly high back pressure is obtained. The back pressure is particularly high there because the sealing bed 26 already protrudes outward into the air flow 36, such that, in comparison with the flow cross section occurring directly in front of the sealing bed 26 on the exterior of the lighting device 10, a narrower flow cross section of the oncoming air is obtained.

The air guidance structure 34 protruding outward over the sealing bed 26 catches a portion of the air 36 flowing past the outside of the sealing bed 26, and deflects this portion through the ventilation intake opening, into the interior. The air guidance structure forms an obstacle with its end that protrudes into the flow of the air flowing past the sealing bed. The aforementioned increased excess pressure results from this flow obstacle. The reference value, in relation to which the back pressure is higher, is a pressure that would result here under otherwise identical conditions, if the air guidance structure was omitted.

Figure 2:
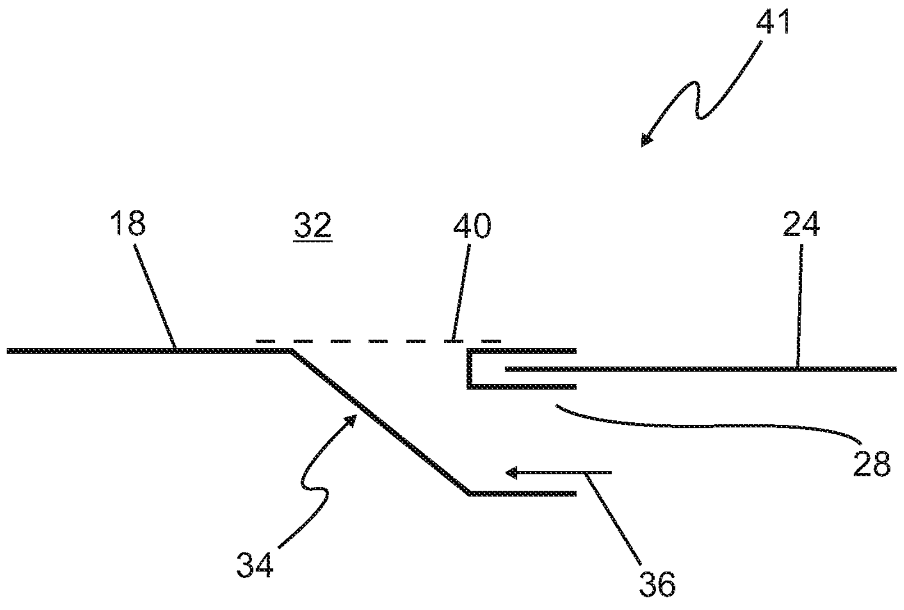
FIG. 2 shows an enlarged detail form FIG. 1.

FIG. 2 shows a detail 41 of FIG. 1, in an enlargement. In detail, FIG. 2 shows the air guidance structure 34, together with the ventilation intake opening 28 in a enlarged depiction, and with an additional filter 40, disposed between the ventilation intake opening 28 and the interior 32. The filter is configured, by means of the size of its pores, to allow air to flow in, but to block, in particular, insects and smaller and larger contaminant particles such as dust and grains of sand. As a result, it is possible to prevent a quick soiling of the lighting device. The filter can be molded as an insert component, or it can be attached using other joining technologies, e.g. hot stamping. This applies to all of the designs depicted herein.

Figure 3:
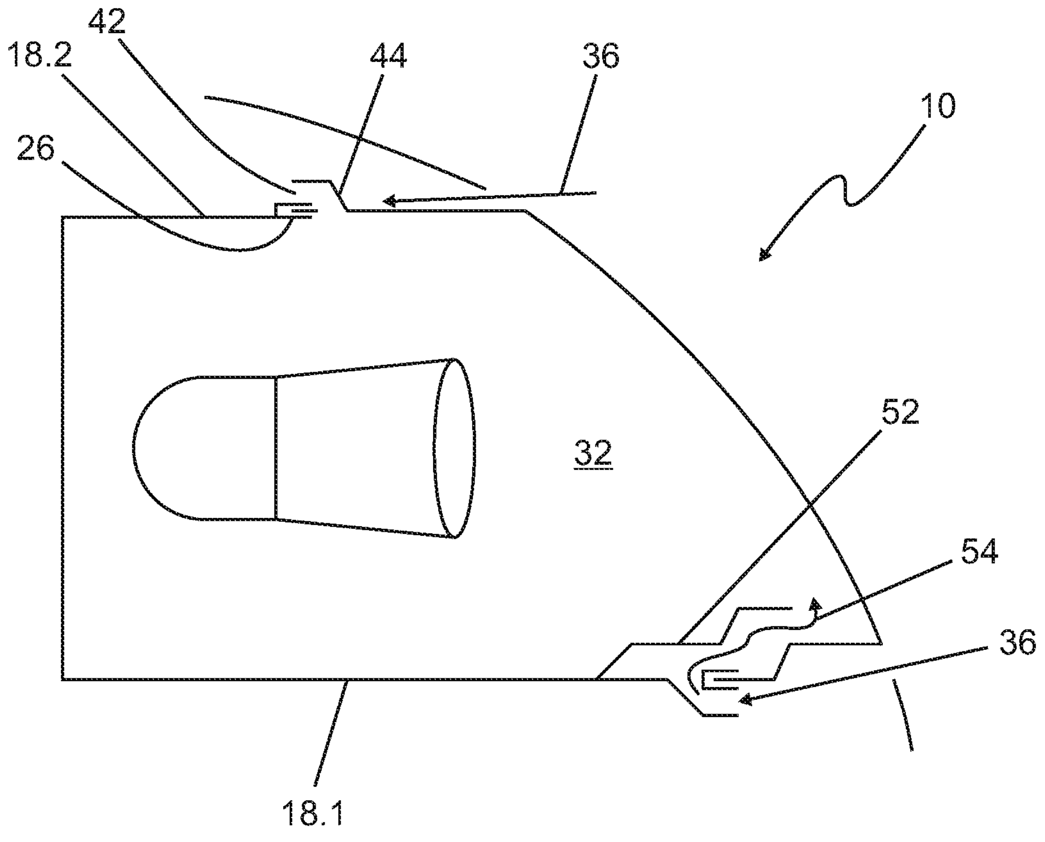
FIG. 3 shows a second exemplary embodiment in a vertical section.

FIG. 3 shows a lighting device that differs from the lighting device according to FIGS. 1 and 2 in its design of its air discharge opening 42. The lighting device 10 according to the Figure has an additional air guidance structure 44.

The air discharge opening 42 lies transverse to the housing wall in the air flow 36 on the outside of the sealing bed 26. With respect to the direction of the air flowing past the outside of the housing driven by the wind generated by driving, the air discharge opening 42 lies behind the first air guidance structure 34, such that the air guidance structure 34 lies in front of the air discharge opening 42 in this direction, in the oncoming air 36. As a result of this position, the air flowing past the outside of the housing 18 exerts a suction effect on the interior 32. Thus, there is a vacuum in the air discharge opening 42. The resulting pressure is lower than the value of the pressure, in particular, that would be obtained in the air discharge opening 42 without the suction effect resulting from the air flow 36. As a result of the position of the air discharge opening 42 in the depicted manner on the sealing bed 26, a particularly high suction effect is also obtained, because the sealing bed already protrudes outward into the air flow. The other air guidance structure 44 protruding outward beyond the sealing bed 26 deflects the air 36 flowing past the outside of the sealing bed 26 further outward, reducing the flow cross section of this air, and thus increasing its flow rate. As a result of this increase in the flow rate, the specified increased suction effect is obtained in the air discharge opening 42 disposed in the flow shadow of the additional air guidance structure 44 that is transverse to this air flow.

The additional air guidance structure 44 is preferably produced in exactly the same manner as the first air guidance structure. It is the case that, with all of the air guidance structures in this application, they are preferably made of the material from which the entire component is made, to which the air guidance structure belongs in a material bonded manner, regardless of whether they are an intake or outlet. In FIG. 3, the air intake is made of the same material as the housing, and the air discharge is made of the same material as the cover plate.

The resulting deflection of the air 36 flowing past the housing, driven by wind generated by driving, into the interior 32 at the first air guidance structure 34, is supplemented in the subject matter in FIG. 3 in that a vacuum, or a suction effect, is generated at the air discharge opening, which suctions air out of the interior 32. As a result, the volumetric flow of the ventilating air obtained in the interior 32 of the lighting device 10 is further increased, which further improves the removal of disruptive moisture form the interior.

The ventilation intake opening 28 with the first air guidance structure 34 is preferably disposed on a first housing surface 18.1, lying opposite a second housing surface 18.2, on which the air discharge opening 42 with the additional air guidance structure 44 is disposed. As a result, a good flow-through in the interior 32, and thus an effective removal of disruptive moisture, is obtained.

The first surface 18.1 and the opposite second surface 18.2 are the respective right-hand and left-hand sides of the lighting device, or vice versa, in one design of the lighting device in an intended use thereof.

In another embodiment, the first surface 18.1 is the lower surface, in an intended use of the lighting device, and the opposite surface 18.2 is the upper surface, in an intended use of the lighting device, such that the air flow flows upward through the interior from below.

The entering air is heated in the interior of the lighting device by the prevailing temperature, resulting from the proximity of the hot motor and/or cooling unit and/or the light sources disposed therein, regardless of whether these are semiconductor chips, or incandescent lamps, or gas discharge lamps. The heating generates a convection-driven air flow, directed upward from below, which increases the flow-through driven by the wind generated by driving, likewise upward from below, and thus improves this flow-through.

The air discharge opening may be disposed laterally on a surface lying opposite the surface in which the ventilation intake opening is located. The air therefore flows not only upward from below, but also in a transverse direction from right to left (or from left to right) through the lighting device. This favors a spatially uniform moisture removal from the interior over the surface of the cover plate.

In another embodiment, air conducting structures 52 such as channels and/or ribs and/or tubes are disposed in the interior 32 of the lighting device 10, which act to conduct at least a portion of the ventilation air volume flow, preferably to the critical areas in the lighting device 10, where particularly large amounts of moisture arise, for example. By way of example, these can be the lower corners of the interior 32 of the lighting device 10.

Figure 4:
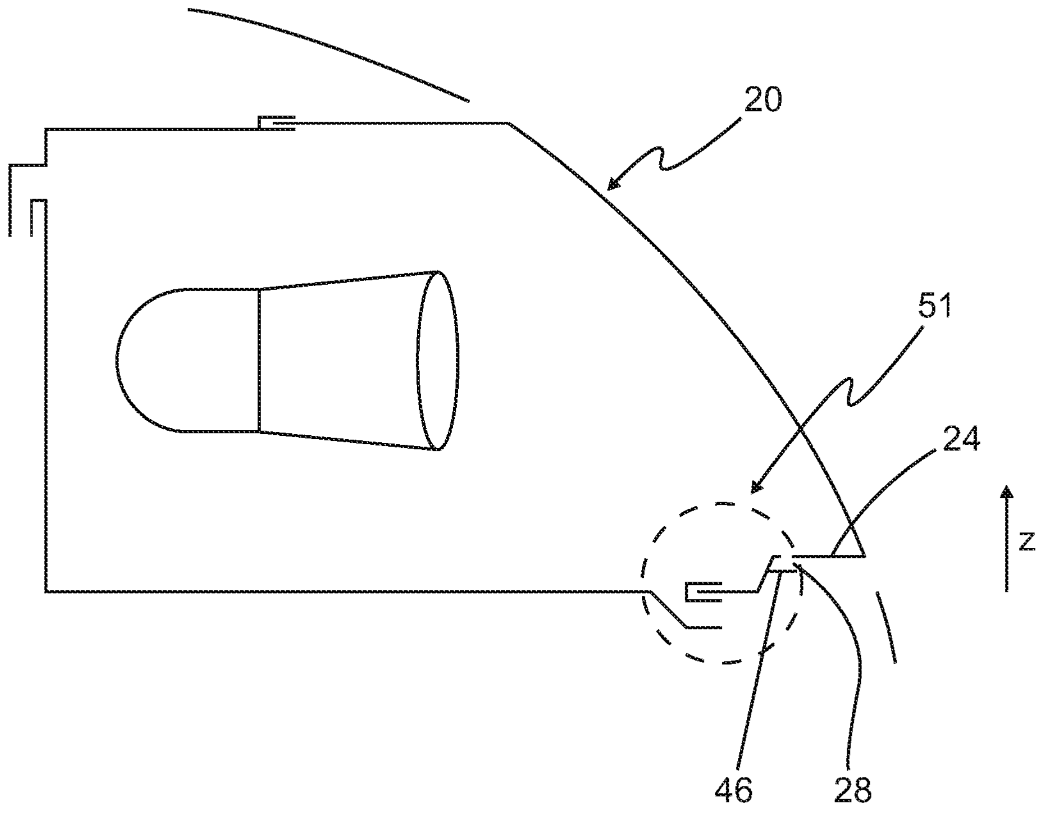
FIG. 4 shows a third exemplary embodiment in a vertical section.
Figure 5:
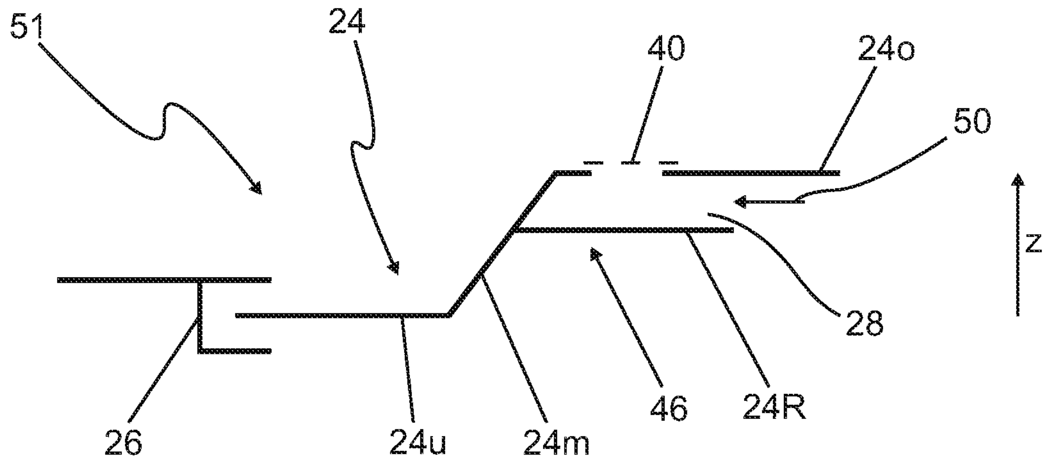
FIG. 5 shows an enlarged detail from FIG. 4.

FIG. 4 illustrates an embodiment in which the ventilation intake opening 28 is integrated with an air guidance structure 46 in the lower part of the edge 24 of the cover plate 20. FIG. 5 shows an enlargement of a detail 51 of this design.

The lower part of the edge 24 is held in a sealing bed 26, which is a component of the housing 18 in the depicted design. In the vertical direction (z-axis), there is an air guidance structure 46 here, between the lower part **24*u* of the edge 24 of the cover plate 20, and an upper part 24*o* of the edge, with which upper part 24*o* the edge 24 of the cover plate 20 transitions into the transparent base 22 of the cover plate 20. The ventilation intake opening 28 is located in the upper part 24*o* of the edge 24, which here as well is preferably provided with a filter 40. Here as well, the filter 40** is configured to prevent an ingress of insects and contaminant particles.

In this embodiment, the air guidance structure 46 is the combination of the middle part 24*m* of the edge, lying between the lower part 24*u* and the upper part 24*o* of the edge 24, which extends vertically (z-axis), and the ribs 24R projecting out horizontally from this middle part 24*m*. The combination of the lower part and the middle part and the upper part of the edge forms a step. The rib projecting out horizontally from the vertical part 24*m* of this step protrudes thereby into the air flow driven by the wind resulting from driving, which backs up at the step. This air back-up is increased further by the rib 24R lying beneath the opening 28, such that the excess pressure is obtained outside the ventilation intake opening 28.

The designs having the ventilation intake-side air guidance structure 34 and having the ventilation intake-side air guidance structure 46 can be combined, respectively, with both the air discharge-side air guidance structure of FIG. 1 as well as with the air discharge-side air guidance structure of FIG. 3.

FIGS. 1, 3 and 4 each show, in addition to designs of the lighting devices 10 according to the invention, an assembly for such a lighting device together with external components 12, 14 in a component area, such as is obtained with an intended use of the respective lighting device 10. These figures thus show an aspect of the invention in the form of an assembly comprising a motor vehicle lighting device 10 and at least one external component 12, 14, in which the lighting device 10 and the external component 12, 14 delimit an air gap 50 in an intended use, through which an air flow 36 caused by wind resulting from driving passes when the motor vehicle is moving, which flows past the lighting device at the side. The flowing past can occur thereby at an upper surface and/or a lower surface and/or a right-hand side and/or a left-hand side of the lighting device 10. These assembly aspects form another invention in combination with the features of the lighting device 10. This other invention is obtained as an assembly comprising a motor vehicle lighting device and at least one external component, in which the lighting device and the external component delimit an air gap in an intended use, through which an air flow caused by wind resulting from driving passes when the vehicle is moving, and having a ventilation intake opening, and having an air discharge opening, characterized in that the lighting device has at least one air guidance structure, which protrudes into the specified air flow cause by wind resulting from driving either directly in front of the air discharge opening or directly behind the ventilation intake opening, seen in the direction of the air flow caused by wind resulting from driving.

The lighting device has at least one ventilation intake opening, and at least one air discharge opening, as well as an air guidance structure, which protrudes into the specified air flow caused by wind resulting from driving, either directly in front of the air discharge opening or directly behind the ventilation intake opening, seen in the direction of the air flow caused by wind resulting from driving.

The external components 12, 14 are parts of the vehicle body, parts of a neighboring lighting device having its own housing, or parts of an cooling unit of the vehicle bordering on the lighting device, for example. There is normally a gap 50 between these external components and the cover plate, through which wind generated by driving can flow. When air flows through this gap, there is a high flow rate and a higher back pressure upstream in front of air guidance structures disposed in the air flow, and a high suction effect downstream, behind air guidance structures disposed in the air flow. The flow rate and the back pressure depend on the speed of the vehicle, and increase with increasing speed.

The lighting device may be employed as a front headlamp or a front lamp. The assembly aspects of the invention favor the existence of a high air volumetric flow between the interior 32 of the headlamp between a ventilation intake opening and an air discharge opening in that the air flow driven by the wind resulting from driving, which flows through the joint between the headlamp and the external components, is used for generating a pressure drop by back pressure and/or suction.

A back pressure is generated upstream of an air guidance structure functioning as a flow obstacle at a ventilation intake opening disposed there, which allows air to flow into the interior 32. A suction is generated downstream of another air guidance structure functioning as a flow obstacle, at an air discharge opening disposed there, which allows air to escape from the interior.

There is a higher pressure in the region of the joints 50 due to the effect of wind resulting from driving, having a large portion that is dependent on the driving speed. Using the air guidance structure disposed at the ventilation intake opening, which faces toward the direction of travel, the driving wind is caught in this region and used for increased ventilation.

The air guidance can not only form a component of the headlamp housing and/or the cover plate, but it can also be a component of a so-called $C_d$ seal. A $C_d$ seal is a component that covers the body joints in a sealing manner, in order to lower the air resistance of the motor vehicle. The air guidance in this case is an opening in the $C_d$ seal.

The invention enables an adjustment of the air guidance structures and the ventilation intake openings to the air flow conditions and ventilation requirements for specific types of vehicles by an adjustment of the position, cross section area of the air guidance structures and ventilation intake openings and air discharge openings, and their orientation in relation to the air flow, such that a differential pressure is obtained between the ventilation intake openings and the air discharge openings by back pressure and/or suction.

As a result, a higher volumetric flow can be generated in a simple manner, which in turn results in a quick evaporation of condensed moisture and the removal thereof, without having to produce and install additional mounting components.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A motor vehicle lighting device having a housing and a transparent cover plate covering a light exit hole in the housing, which cover plate is in the shape of a shell, having a transparent base and an edge encircling the base and projecting up from the base in the manner of a wall, the edge being received by a sealing bed encompassing the light exit opening in the housing, and retained in the sealing bed in a tight and secure manner, wherein the housing and the cover plate delimit an interior of the lighting device, in which light sources are disposed, and wherein at least one ventilation intake opening is disposed in the housing, wherein a first air guidance structure is disposed at the ventilation intake opening and on the outside of the ventilation intake opening, wherein the first air guidance structure protrudes outward over the sealing bed, wherein the ventilation intake opening lies on the outside of the sealing bed, transverse to a housing wall that abuts the ventilation intake opening, and wherein at least one air discharge opening is disposed in the housing and wherein a second air guidance structure is disposed at the air discharge opening and on the outside of the air discharge opening, wherein the second air guidance structure protrudes outward over the sealing bed, wherein the air discharge opening lies on the outside of the sealing bed, transverse to a housing wall that abuts the air discharge opening, and wherein air conducting structures such as channels, ribs or tubes are disposed in an interior of the lighting device.

2. The motor vehicle lighting device as set forth in claim 1, wherein the ventilation intake opening lies in front of a first air guidance structure in the direction of the oncoming air, in relation to the direction of the oncoming air driven along the outside of the housing by the wind caused by driving.

3. The motor vehicle lighting device as set forth in claim 2, wherein the ventilation intake opening, having the air guidance structure is disposed on a first housing surface, which lies opposite a second housing surface, on which the air discharge opening having another air guidance structure is disposed.

4. The motor vehicle lighting device as set forth in claim 3, wherein a first surface and an opposing second surface are the respective right-hand side and left-hand side of the lighting device.

5. The motor vehicle lighting device as set forth in claim 4, wherein a first surface is a lower surface, in an intended use of the lighting device, and the opposite second surface is the upper surface of the lighting device, in an intended use of the lighting device, such that the air flow flows upward through the interior from below.

6. The motor vehicle lighting device as set forth in claim 2, wherein the air discharge opening lies behind the first air guidance structure in relation to the direction of the air flowing past the outside of the housing driven by wind caused by driving, such that the air guidance structure lies in this direction in front of the air discharge opening in the oncoming air.

7. The motor vehicle lighting device as set forth in claim 1, wherein the air guidance structure is a component of the cover plate and is disposed between an end lying in the sealing bed and a light exit surface of the cover plate, said sealing bed is a component of the housing, and forms a mount for the cover plate.

8. The motor vehicle lighting device as set forth in claim 1, wherein the air guidance structure is a component of the housing.

9. The motor vehicle lighting device as set forth in claim 1, wherein the air guidance structure is a component, with which a joint is covered between the housing and the cover plate on one side, and an external component of the motor vehicle on the other side.

10. The motor vehicle lighting device as set forth in claim 1, wherein a filter, disposed between the ventilation intake opening and the interior, and allows air to flow in, but to prevent, in particular, insects and larger smaller and larger contaminant particles such as dust and grains of sand, from entering, due to the size of its pores.

11. The motor vehicle lighting device as set forth in claim 1, wherein the air discharge opening is disposed laterally on one of the surfaces lying opposite the ventilation intake opening.

12. The motor vehicle lighting device as set forth in claim 1, wherein air conducting structures such as channels or ribs or tubes are disposed in the interior of the lighting device, and which conduct at least a portion of the ventilation intake volumetric flow, to a region in the lighting device.

* * * * *